R. A. SMITH.
FLEXIBLE COUPLING.
APPLICATION FILED OCT. 13, 1915.
1,225,518. Patented May 8, 1917.
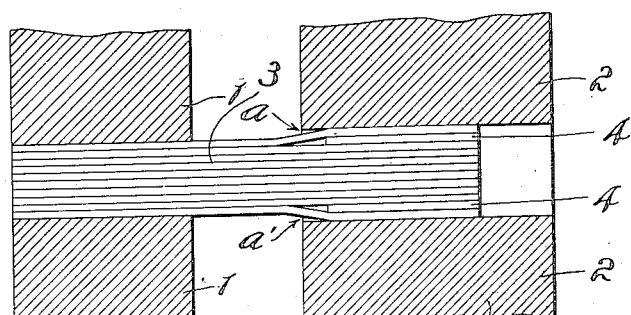
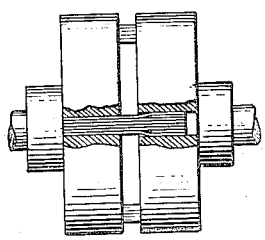
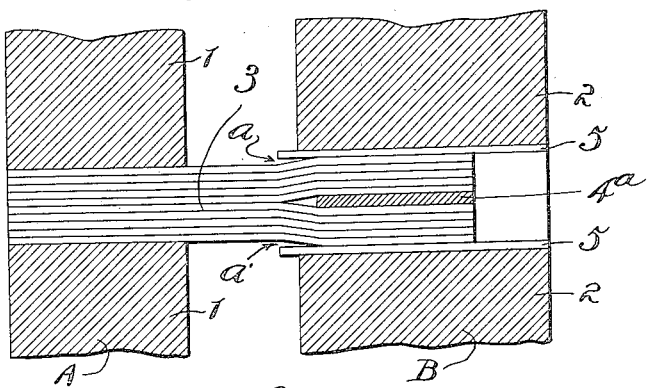
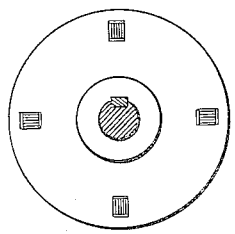
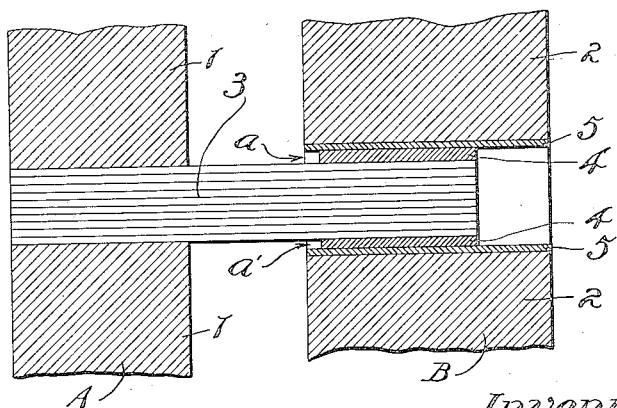
Inventor:
Robert A. Smith.

UNITED STATES PATENT OFFICE.

ROBERT ARMSTRONG SMITH, OF MAHWAH, NEW JERSEY, ASSIGNOR TO SMITH-SERRELL CO., INC., OF NEW YORK, N. Y., A CORPORATION OF NEW JERSEY.

FLEXIBLE COUPLING.

1,225,518.    Specification of Letters Patent.    Patented May 8, 1917.

Application filed October 13, 1915. Serial No. 55,729.

*To all whom it may concern:*

Be it known that I, ROBERT A. SMITH, a citizen of the United States, residing at Mahwah, New Jersey, have invented certain new and useful Improvements in Flexible Couplings, of which the following is a specification.

The present invention relates to improvements in flexible couplings, and pertains more particularly to that form of coupling in which the driving and driven member are connected by a plurality of superimposed flat steel springs.

The present invention consists in certain improved details of construction in flexible couplings, and is in principle substantially similar to the form of coupling pin described in my co-pending application filed September 5, 1914, Serial Number 860,439, patented December 28, 1915, No. 1,165,551.

The principal object of the invention consists in providing a flexible coupling of the type hereinbefore referred to with spacing means suitably arranged in relation to the flat steel springs, of which the coupling is made up.

Experience has shown, in using couplings of this type, that under some conditions an end thrust is produced caused by the bending of the springs against the corners of the flanges of the driving and driven members, and the object of the present invention is to provide a construction equipped with means which will avoid the trouble arising from such end thrust.

With these and other objects in view, the invention consists of the combination and arrangement of parts more fully described in the following specification, illustrated in the accompanying drawing, and pointed out in the appended claims.

In the drawing:

Figure 1 is a longitudinal sectional view showing the connecting member.

Fig. 2 is a similar view showing a modification of the invention.

Fig. 3 is a view similar to Figs. 1 and 2 showing a further modification of the invention.

Fig. 4 is a view shown in side elevation of a flexible shaft coupling having the present invention embodied therein.

Fig. 5 is a sectional elevation of one of the coupling members shown in Fig. 4.

Referring now to the drawing, the flanges of the driving and driven members A, B, of the coupling are shown at 1, 1 and 2, 2. A plurality of superimposed laminated flat springs 3 form the connecting means between the driving and driven members A and B, being flexibly fitted between the flanges, as shown.

In order to avoid the thrust effect due to the action of the outside springs on the corners of the flange parts, one or more spacing means 4 are provided which will space the outermost leaves from the corners.

Such means may consist of a flat piece or plate 4 located between the outermost leaves 3 and the next inner adjacent leaves, as shown in Fig. 1, causing a rounding or inclining inward of the outermost leaves away from the flange corners, as indicated by the small arrows $a$, $a'$.

The spacing means may consist of a single flat piece $4^a$ centrally located (as shown in Fig. 2) between the leaf springs 3 at one or both ends. This arrangement causes a rounding or inclining inward of the outer leaves away from the flange corners, as indicated by the arrows $a$, $a'$. A pair of wearing plates 5, 5, are used in this form of the invention, being fixed in relation to the flanges 2, 2, and as here shown they extend slightly beyond the inner corners of the flanges.

In the modification shown in Fig. 3, wearing plates 5, 5, are shown which are fixed in relation to the flanges 2, 2, and in this form the spacing members 4, 4, are interposed between the outer springs 3 and these wearing plates. The leaf springs 3 and spacing means 4, 4, are slidably retained between the flanges 2, 2, the spacing means 4, 4, moving with the springs 3, 3, in relation to the wearing plates 5, 5, and coupling member B, while the wearing plates 5, 5, do not move and are only intended to be removed when they are worn out for the purpose of replacing them by new ones.

It may be desirable to use a pair of wearing plates (as shown at 5 of Fig. 2) projecting slightly beyond the edges of the flange corners. The use of the wearing plates, however, is optional, and as the plates, when used, are removably attached to the flanges 1, 1 and 2, 2, they may, for all practical purposes, be considered parts of the driving and driven members A and B.

It will be understood that the wearing plates 5 are not essential to the success of the invention, and may be completely dispensed with when so desired.

One of the principal advantages of the present invention is the use of the spacers 4 by means of which the leaf springs 3 are spaced away from the flange corners, leaving the spaces $a$, $a$, and $a'$, $a'$, so that the side pressure of the load or misalinement of the parts does not produce an end thrust as in former devices of this character. Under cases of severe load or misalinement the touching of a spring to a corner stiffens it because it shortens the distance between supports.

While the invention is shown with both the coupling members formed with a recess, the springs being firmly held in the one and slidably held in the other, it is obvious that instead of holding the springs in a recess at the firm end that they might be held by an external means, without in any way departing from the scope of the invention.

I claim as my invention:—

1. A coupling comprising in combination driving and driven members, one of said members being formed with a recess, a laminated flexible member for connecting the driving and driven members, a set of superimposed leaf springs having one end seated in said recess, and spacing means between certain of said springs.

2. A coupling comprising in combination a driving and a driven member, one of said coupling members being formed with a recess, a laminated flexible member for connecting the driving and driven members comprising a set of superimposed leaf springs having one end seated in said recess, and means coöperating with said springs whereby a clearance is afforded between the edge of the recess in the coupling member and said springs.

3. A coupling comprising in combination a driving and a driven member, one of said members being formed with a recess, a laminated flexible member for connecting the driving and driven members of the coupling comprising a set of superimposed leaf springs having one end seated in said recess, and means free from contact with said coupling member spacing apart certain of the leaf springs at one end.

4. A laminated flexible spring member for connecting the driving and driven members of a coupling, one of said coupling members being provided with a recess, the laminated flexible spring member having an end movably seated in said recess, the first point of contact between the outside spring of the laminated flexible spring member and the recessed member being normally back of the inside edge of said recessed coupling member.

5. The combination with a driving and a driven member, one of said members being formed with a recess, of a laminated flexible member for connecting the driving and driven members comprising a set of superimposed leaf springs having one end firmly retained and the opposite end slidably retained, and spacing means for the springs at the latter end so positioned in relation thereto as to maintain a clearance between the outermost springs and the corners of the recessed member.

6. The combination with a rotary driving member and a rotary driven member, one of said members being formed with a recess, of a laminated flexible member for connecting the driving and driven members consisting of a set of superimposed leaf springs having one end firmly retained, and spacing means for the springs at one end so positioned in relation thereto as to maintain a clearance between the outermost springs and the corners of the recessed member.

7. The combination with a rotary driving member and a rotary driven member, one of said members being formed with a plurality of recesses circumferentially disposed, of a plurality of laminated flexible members, each consisting of a set of superimposed leaf springs having one end firmly retained, and spacing means for the springs at one end so positioned in relation thereto as to maintain a clearance between the outermost springs and the corners of the recessed member.

In testimony whereof I affix my signature in presence of two witnesses.

ROBERT ARMSTRONG SMITH.

Witnesses:
JESSIE F. COE,
EDITH HEALEY.